J. & T. NEVISON, Jr.

Carriage Wheel.

No. 79,495.

Patented June 30, 1868.

Inventors
James Nevison
Thomas Nevison

Witnesses

United States Patent Office.

JAMES NEVISON AND THOMAS NEVISON, JR., OF MORGAN, OHIO.

Letters Patent No. 79,495, dated June 30, 1868.

IMPROVED CARRIAGE-WHEEL.

*The Schedule referred to in these Letters Patent and making part of the same.*

TO ALL WHOM IT MAY CONCERN:

Be it known that we, JAMES NEVISON and THOMAS NEVISON, Jr., of Morgan, in the county of Ashtabula, and State of Ohio, have invented certain new and useful Improvements in Carriage-Wheels; and we do hereby declare that the following is a full and complete description of the same, reference being had to the accompanying drawings, making a part of this specification, in which—

Figure 1:
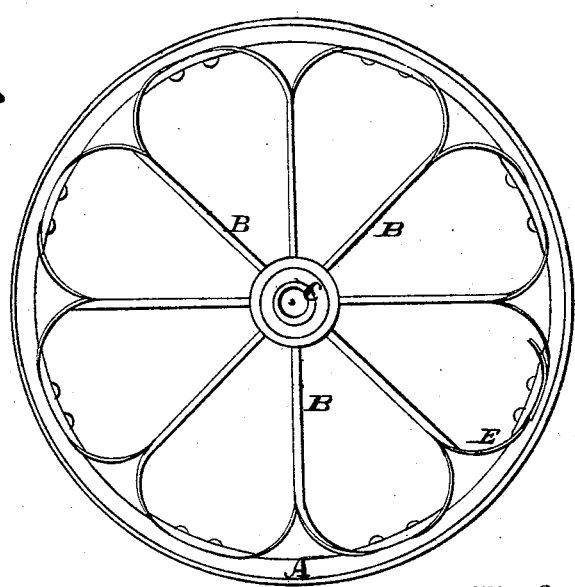

Figure 1 is a side view of the wheel.

Figure 2:
Figure 3:
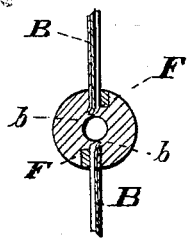
Figure 4:
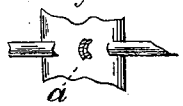

Figures 2, 3, and 4 are detached sections, to which reference will be made.

Like letters of reference refer to like parts in the views.

In fig. 1, A represents the felloe or rim of the wheel, B B are the spokes, and C the hub. These spokes are constructed of metal, and of the peculiar shape shown in the drawing, in which it will be seen that the straight part of said spokes is made fluting or channelled from the hub to the point X, as shown at $a$, fig. 4.

It will also be seen that the spokes are double, and that each part is made of one entire piece, extending from the hub to the felloe, thence back to the hub, and that the straight section of one spoke lies close in the channel or furrow of the other, with which it is immediately associated, as shown in fig. 3. The upper ends of both spokes are secured in the hub, by having their ends slightly bent, forming a kind of lip or hook, $b$, fig. 3, which, on being inserted in the mortise of the hub, a key, F, is then driven in by the side, thereby firmly securing the spokes in place, as shown in fig. 3.

E is a spring-leaf, placed upon the spoke at its junction with the felloe, the application of which gives additional strength to the elastic character of the spokes, hence they are less liable to break, and will sustain a much heavier weight from above, without lessening the resilient power at the bottom.

A wheel thus constructed is light, strong, and durable, and in giving the fluted shape to the spoke above described, is obtained an increase of strength without adding to the weight of material.

What we claim as our improvement, and desire to secure by Letters Patent, is—

1. The return or hook $b$, and spring-spokes B, in combination with the key F, and hub C, substantially as set forth.

2. Spring-leaves E, bolted to and in combination with the spring-spoke, substantially as set forth.

JAMES NEVISON,
THOMAS NEVISON, JR.

Witnesses:
W. H. BURRIDGE,
E. E. PINNEY.